R. McFARLANE.
SCALE.
APPLICATION FILED MAR. 12, 1914.
1,177,195.
Patented Mar. 28, 1916.
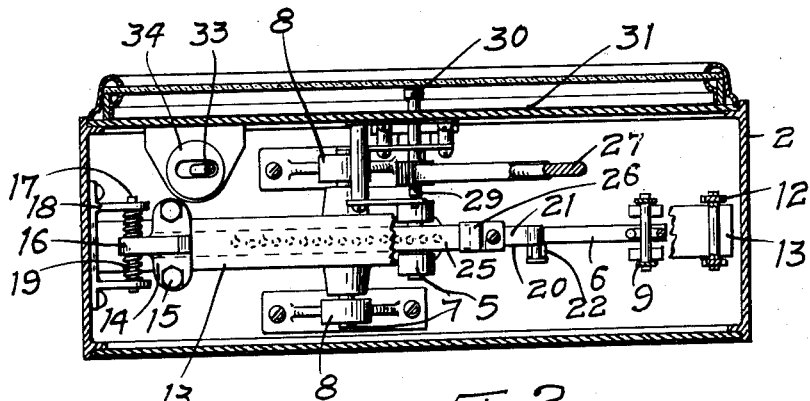
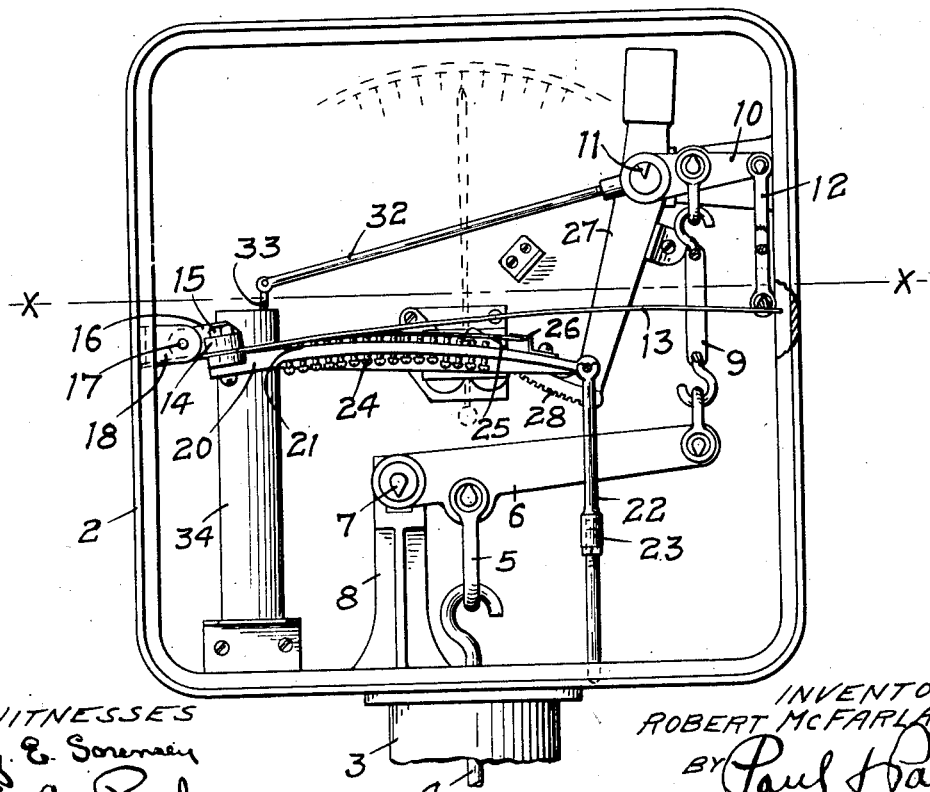
WITNESSES
G. E. Sorensen
E. A. Paul
INVENTOR
ROBERT McFARLANE
BY Paul & Paul
ATTORNEYS

UNITED STATES PATENT OFFICE.

ROBERT McFARLANE, OF MINNEAPOLIS, MINNESOTA, ASSIGNOR TO McFARLANE MANUFACTURING COMPANY, OF CHICAGO, ILLINOIS, A CORPORATION.

SCALE.

1,177,195.  Specification of Letters Patent.  Patented Mar. 28, 1916.

Application filed March 12, 1914. Serial No. 824,239.

*To all whom it may concern:*

Be it known that I, ROBERT McFARLANE, a citizen of the United States, resident of Minneapolis, county of Hennepin, State of Minnesota, have invented certain new and useful Improvements in Scales, of which the following is a specification.

My invention relates to portable scales and the object of the invention is to provide a scale of the spring type, having improved means for regulating the tension or resistance of the spring to the load to the end that the scale can be easily and quickly adapted for accurate work and having a wide range of adjustment, and which can be used for weighing light or heavy loads.

The invention consists generally in various constructions and combinations, all as hereinafter described and particularly pointed out in the claims.

In the accompanying drawings forming part of this specification, Figure 1 is a rear elevation of the scale with the back plate removed, illustrating the scale construction, Fig. 2 is a horizontal sectional view on the x—x of Fig. 1.

In the drawing, 2 represents a suitable casing, mounted on a hollow standard or pedestal 3 in which is a scale rod 4, attached at its lower end in the usual way to the platform levers, not shown. The upper end of the rod 4 has a pivotal engagement with the link 5 carried by a beam 6 that is pivoted at 7 at one end on a standard 8 adjacent to the pivotal connection of the link 5 with said beam. A link 9 pivotally connects the other end of the beam 6 with a beam 10 that is pivoted at 11 on the scale casing. A link 12 pivotally connects the beam 10 with the free end of a flat steel spring 13 that is secured at its other end in a bearing on the wall of the casing. Said bearing preferably includes jaws 14 between which the end of the flat spring is inserted and secured by bolts 15, one of said jaws having an ear 16 pivoted on a pin 17 that is carried by brackets 18 on the wall of the casing. Springs 19 on the said pin center the ear 16 thereon. A bar 20 is secured at one end to the jaws 14 and has a curved upper surface 21 and at its free end is provided with a standard 22 which bears on the bottom of the casing and is provided with a turn buckle attachment 23 by means of which the bar and the jaws 14 can be oscillated on the pin 17 to obtain the desired adjustment in setting up the scale. Tapped into this bar 20 is a series of machine screws 24 arranged in close proximity to one another, as shown, and having their heads accessible to a screw driver or similar tool, and engaging at their upper ends with a comparatively thin steel tape 25, which is clamped at one end between the jaws beneath the spring plate 13 and is held against accidental displacement at its other end by a clip 26. This tape forms a bearing surface for the spring plate when it is flexed and evidently the tension of the spring plate or its resistance to the load on the scale can be increased or decreased by the adjustment of the screws 24. If the screws near the jaws are withdrawn and those at the outer end of the bar are projected, then the fulcrum of the spring plate will be moved toward its free end and its leverage on the load increased, while on the other hand, if the screws near the outer end of the bar are withdrawn and those near the jaws are projected, the short and long arms of the spring plate will be reversed and the leverage of the load on the plate increased.

In setting up the scale, it is only necessary to adjust the screws until a balance is obtained and then the application of the load to the scale will flex the spring plate, the travel of which may be indicated by the mechanism ordinarily employed for this purpose. This mechanism consists preferably of a quadrant 27 mounted to rock with the beam 10 and having a curved rack 28 which engages the pinion 29 of an indicator hand 30 that is mounted to move back and forth over a dial 31. Regularity of movement is obtained by means of a rod 32 carried by the beam 10 and pivotally connected with a plunger 33 that is movable in a dashpot 34. This mechanism for transmitting movement to an indicating device may be modified in various ways, and I do not wish to be confined to the particular arrangement shown herein, the essential feature of the invention being the flat spring plate and the means for increasing or decreasing its resistance to the pull of the load on the scale.

In various ways the details of construction herein shown and described may be modified and still be within the scope of my invention.

I claim as my invention:

1. The combination, with a scale rod, of a horizontal spring bar, a support forming a fulcrum for one end of said bar, a beam whereto said scale rod is pivotally connected, means pivotally connecting said beam with the other end of said bar, and an indicating device also operatively connected with said other end of said bar.

2. The combination, with a scale rod, of a flexible bar operatively connected therewith to be flexed thereby, a series of screws mounted to be moved toward or from said bar, a tape interposed between said screws and bar, the adjustment of said screws changing the fulcrum of said bar and increasing or decreasing its leverage on said rod and an indicating device operatively connected with said bar.

3. The combination, with a scale rod, of a flexible bar, a support for one end of said bar having a curved surface, means mounted in said support in the path of said bar to contact therewith and change the position of the fulcrum therein, to increase or decrease its leverage on said scale rod, means connecting the free end of said bar with said scale rod, an indicating device, and means connecting said indicating device with said bar.

4. The combination, with a scale rod, of a flexible bar, a support wherein one end of said bar is clamped, said support being pivotally mounted and having a curved upper surface, means to tilt said support and adjustably hold it on its pivot, means connecting the free end of said bar with said scale rod, means carried by said support and capable of projection or retraction therein toward or from said bar for changing the fulcrum therein on said support, an indicating device, and means connecting with said bar.

5. The combination, with a suitable casing, of a scale rod, a bar pivotally supported in said casing and having a curved surface, means for tilting said bar on its pivot, a flat flexible bar mounted at one end of said hinged bar, and overhanging its curved surface, means for connecting the free end of said flexible bar with said scale rod, and a series of contacting surfaces mounted in said hinged bar and adapted to be moved into the path of said flexible bar to present a curved bearing surface therefor, the fulcrum of said flexible bar on said bearing surfaces being changed by the projecting or retraction of said contacting surfaces, an indicating device, and means connecting it with said flexible bar.

6. The combination, with a scale rod, of a flexible bar having a fulcrum at one end, a beam having a pivotal support and connected with said rod, a second beam, a link connecting said first named beam with said second beam, a link connecting said second beam with one end of said bar and an indicating device operatively connected with said second beam.

In witness whereof, I have hereunto set my hand this 28" day of February, 1914.

ROBERT McFARLANE.

Witnesses:
GENEVIEVE E. SORENSEN,
EDWARD A. PAUL.